Figure 3:
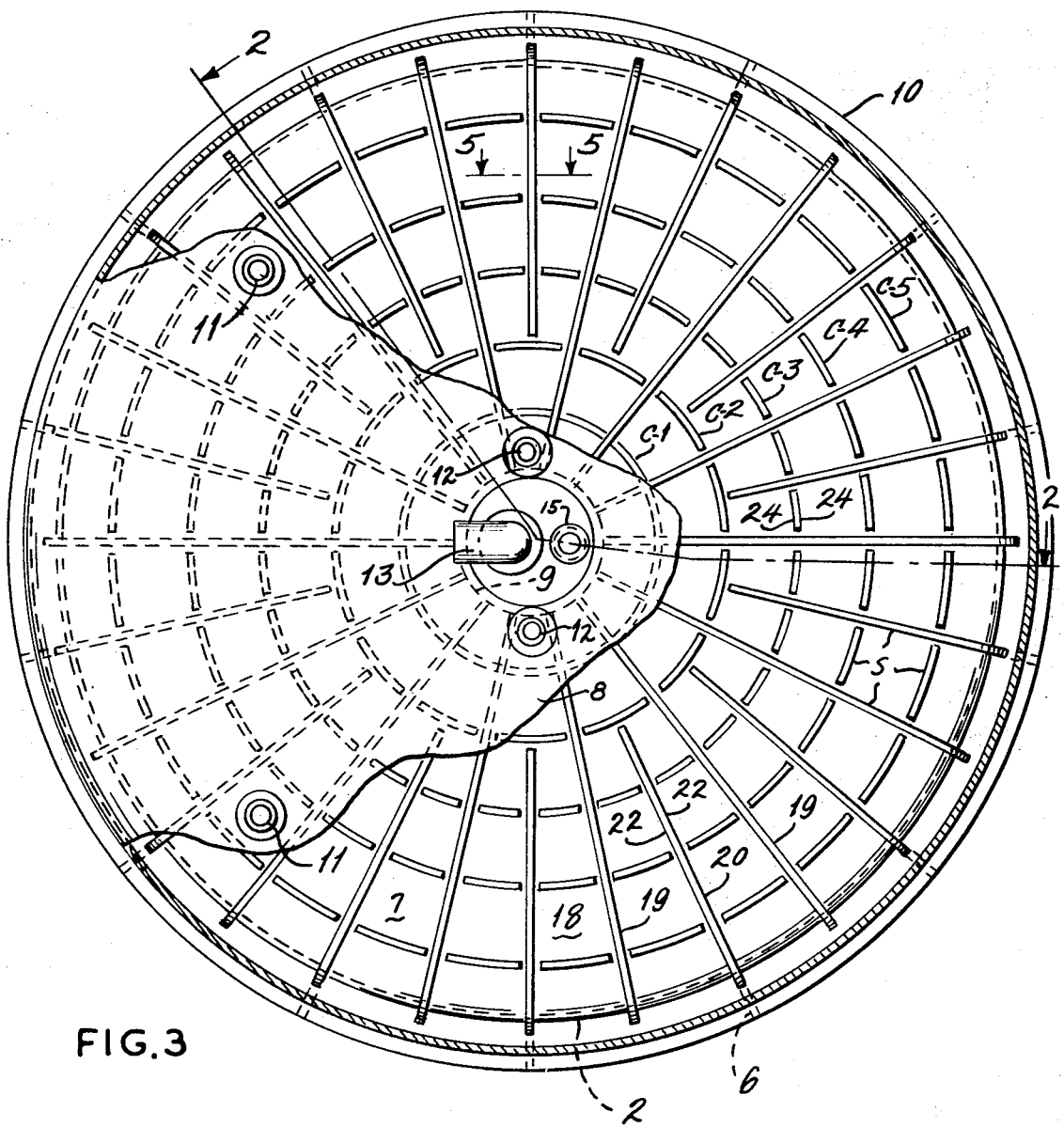

United States Patent
Heilmann

[15] 3,685,508
[45] Aug. 22, 1972

[54] TANK CONSTRUCTION
[72] Inventor: Le Roy W. Heilmann, Belleville, Ill. 62220
[73] Assignee: Nooter Corporation, St. Louis, Mo.
[22] Filed: May 18, 1970
[21] Appl. No.: 38,128

[52] U.S. Cl. .................126/378, 220/15, 126/390
[51] Int. Cl. ........................................A47j 27/16
[58] Field of Search ....126/378, 390; 220/15, 68, 14, 220/10

[56] References Cited

UNITED STATES PATENTS

| 233,189 | 10/1880 | Barrows | 220/15 |
| 2,411,006 | 11/1946 | Sharp | 126/378 |
| 2,659,802 | 11/1953 | Garrett et al. | 126/378 X |

FOREIGN PATENTS OR APPLICATIONS

| 734,868 | 8/1955 | Great Britain | 126/378 |

Primary Examiner—Frederick L. Matteson
Assistant Examiner—W. C. Anderson
Attorney—Gravely, Lieder & Woodruff

[57] ABSTRACT

A tank bottom having spaced inner and outer members, said inner member being made of relatively thin material having good heat transfer, said spaced inner and outer members forming part of a pressure chamber for heating the contents of said tank, said pressure chamber being subjected to relatively high pressures and temperatures, said inner bottom having strengthening means connected to the outer surface thereof, said strengthening means not being connected to said outer member, said inner member being strong enough to hold the contents of the tank but not strong enough to withstand the cyclical pressures within the pressure chamber over a period of use without said strengthening means.

6 Claims, 5 Drawing Figures

Patented Aug. 22, 1972
3,685,508
2 Sheets-Sheet 1
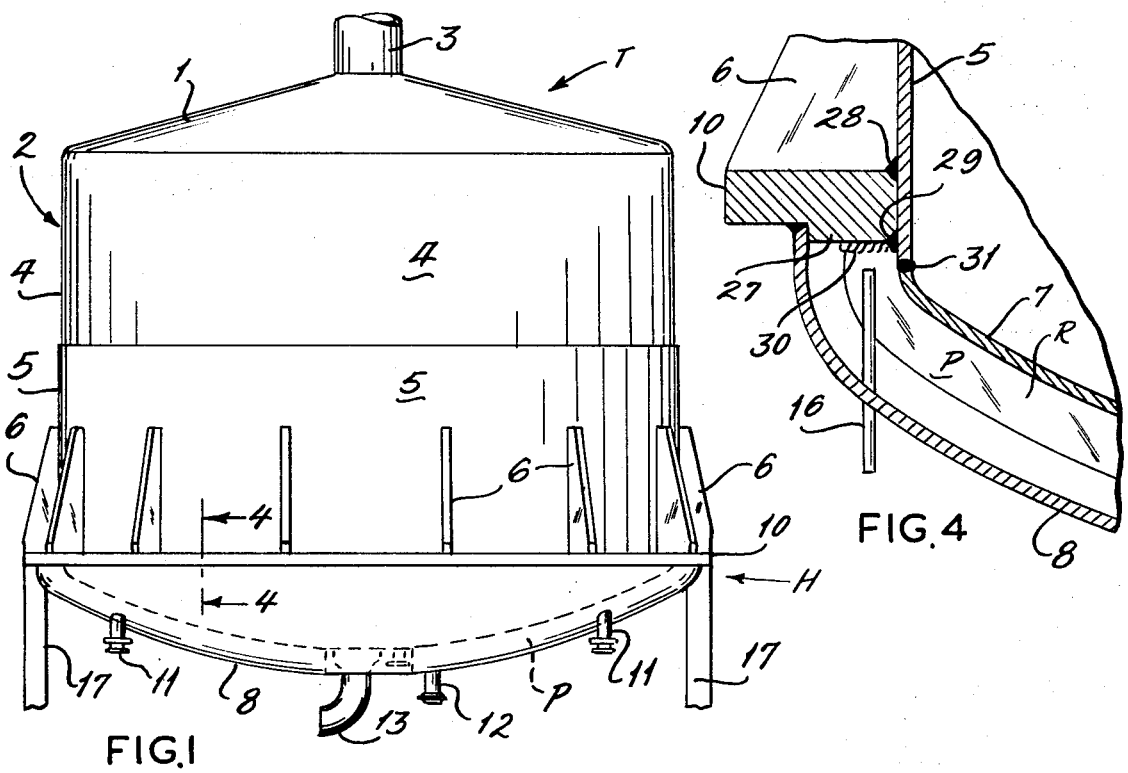
FIG. 1
FIG. 4
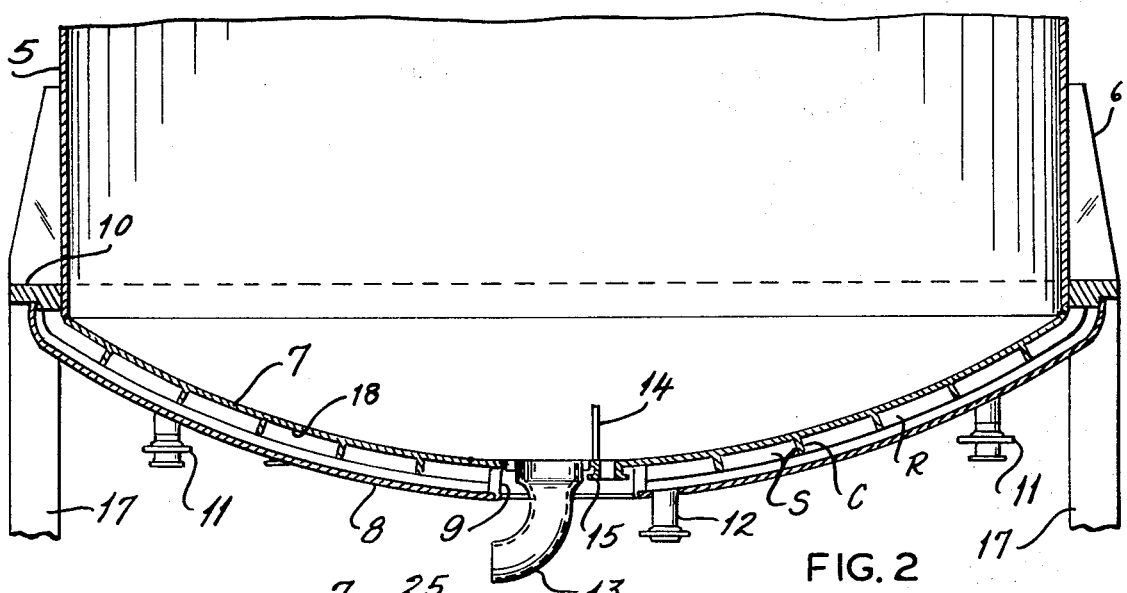
FIG. 2
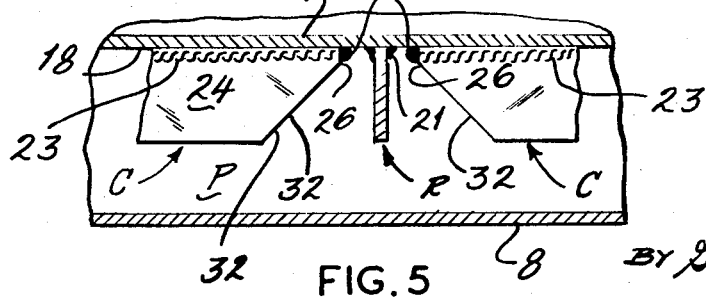
FIG. 5
INVENTOR:
LEROY W. HEILMANN
BY Gravely, Lieder & Woodruff
ATTORNEYS Patented Aug. 22, 1972

3,685,508

2 Sheets-Sheet 2

INVENTOR:
LE ROY W. HEILMANN

BY Gravely, Lieder & Woodruff

ATTORNEYS.

TANK CONSTRUCTION

This invention relates to an improved tank construction having a relatively thin head with strengthening means connected to the outer surface thereof, and in particular, to a kettle having a bottom head which forms part of an external pressure chamber. The invention has been illustrated as applied to a brew kettle but may be used in other vessels in the brewing industry and may be used in process vessels which are needed in other industries.

Brew kettles and other vessels requiring heat have been used for many years in the brewing industry. Some brew kettles have been provided with a jacket around their lower side portion and bottom to form a chamber for receiving steam under relatively high temperature and pressure to heat the contents within the kettle. On such prior kettles the jacket is formed by the inner head or bottom of the kettle and an outer head or bottom spaced about 2 inches from the inner head. The outer head is secured to the inner head by numerous clips or small brackets spaced several inches apart in concentric circles over the entire circular bottom area, which may be about 13 feet in diameter. The clips are welded to the inner and outer members to keep then in fixed spaced relation. Such vessels performed satisfactorily under previous conditions wherein only about six brews or less were made per day, but with increased capacities in other steps of the brewing process it has been necessary to run 10 or 13 brews per day through the vessels of a specific size or volume. Increasing the number of brews per day increases the number of cycles of use wherein the pressures and temperatures are raised and lowered. This increased use sets up certain fatigue within the welds and/or metal used in the kettle, so that the welds between the clips and the inner and/or outer heads are likely to fail after a certain number of cycles. Such failure necessitates expensive repairs and down-time of the equipment, thereby resulting in loss of production. At present, each cycle or batch in a typical brew kettle takes about 32 minutes, with the temperature of the contents in the kettle being raised from below 168° to 212°F. In some vessels the temperatures may vary between about 95°F. and 212°F. During this time live steam at 50 psi and 300°F. is directed into the pressure chamber or steam jacket to heat the contents of the vessel within the predetermined time for proper brewing.

One of the principal objects of the present invention is to provide an improved tank construction wherein the bottom may use thin material which gives better heat transfer and which is less costly, but whose outer surface has strengthening means connected thereto so as to withstand the cyclical conditions of external head pressure. Another object is to provide such a construction wherein the inner bottom member is not tied to the outer bottom member. Another object is to provide an inner bottom member which can be constructed entirely free of the outer bottom member, with the outer bottom member being applied thereafter in spaced relation thereto. A further object is to provide a bottom member for a kettle or tank which can be made of thin material by using strengthening means on the outside surface of said bottom member, that is, on the opposite surface from the surface which is in contact with the contents of the tank. A still further object is to provide a construction which avoids failure and in which there is no chain reaction of failure, since in the older design if one clip failed then the remaining clips were overloaded thereby causing further possible failures of other clips and the collapse of the inner bottom.

These and other objects and advantages will become apparent hereinafter.

The present invention is embodied in a tank bottom having spaced inner and outer members, said inner member being made of relatively thin material having good heat transfer, said spaced inner and outer members forming part of a pressure chamber for heating the contents of said tank, said pressure chamber being subjected to relatively high pressures and temperatures, said inner bottom having strengthening means not connected to the outer surface thereof, said strengthening means not connected to said outer member, said inner member being strong enough to hold the contents of the tank but not strong enough to withstand the cyclical pressures of the pressure chamber over a period of use without said strengthening means.

The invention also consists in the parts and in the arrangements and combinations of parts hereinafter described and claimed. In the accompanying drawings which form part of this specification and wherein like numerals and symbols refer to like parts wherever they occur:

FIG. 1 is a side elevational view showing a tank embodying the present invention, FIG. 2 is an enlarged fragmentary vertical cross-sectional view taken along the line 2—2 of FIG. 3 showing a tank bottom embodying the present invention, FIG. 3 is a bottom plan view showing the strengthening means after the outer bottom member has been removed, FIG. 4 is an enlarged fragmentary sectional view taken along the line 4—4 of FIG 1, and FIG. 5 is a fragmentary sectional view taken along the line 5—5 of FIG. 3.

Referring now to the the drawings in detail, it will be seen that the embodiment of the invention which has been illustrated comprises a head H on a tank T. The head H may be the bottom head or bottom of a process vessel or brew kettle, as shown in the drawings, or may be part of a tank for chemicals or the like. The tank or brew kettle T shown has a bottom head H, an upper head 1, and a tubular or cylindrical wall therebetween. The upper head 1 is of conventional form for a brew kettle and is provided with the necessary receiving opening for the liquid wort, doors for closing said opening, washing equipment, and an exhaust pipe 3 for the vapor from the heated contents. The wall 2 shown is cylindrical, and has an upper shell 4 and a heavier lower shell 5. The upper shell 4 and upper head 1 are made from 10 gauge stainless steel. The lower shell 5 is made from 20 percent clad carbon steel five-sixteenths inch thick. This means that 20 percent of the thickness, or about 0.062 inch, is stainless steel. A carbon steel backing comprises the remaining 80 percent of the thickness. The stainless steel is placed on the inside of the kettle T so that the liquid wort, or other contents, is contacted only by stainless steel. This is important in the brewing of beer. Other clad materials may be important when heating or treating chemicals. The lower portion of the lower shell 5 is further strengthened by a plurality of spaced gussets 6 which are suitably secured thereto, preferably by welding.

As shown in FIGS. 2, the bottom head H comprises an inner member 7 and an outer member 8 supported in spaced parallel relation about 4 inches apart by means of an inner annular wall 9 and a circumscribing flange or stiffener 10. The inner member 7 must be of uniform curvature without flat spots therein and its tolerances must be controlled carefully or thicker material will have to be used. The flange 10 is positioned at or near the bottom of the lower shell 5 at a point adjacent to the inner member 7. THe inner annular wall 9 is positioned near the center of the bottom head H. These parts form a s steam jacket or pressure chamber P, which has a number of steam inlets 11 near the outer edge of the outer member 8 and a number of steam outlets 12 near the center portion of the outer member 8. The pressure chamber P is defined by the inner member 7, the outer member 8, the inner annular wall 9, and the flange 10. The central portion of the inner member 7 is provided with an outlet 13 for the contents of the tank T, a thermowell 14 for measuring and recording the temperature of the contents, and a tank spud 15. The outer portion of the outer member 8 is provided with air outlets 16 which have suitable valves therein (not shown). The tank T is supported on legs 17 which rest on a supporting surface and are connected to the outer member 8 and the flange 10. The tank T and the outer member 8 are suitably insulated with insulation (not shown).

As shown in FIG. 3, the outer surface 18 of the inner member 7 has strengthening means S connected thereto, such as by welding. The strengthening means S are positioned over each small area of the outer surface 18. The strengthening means S extend outwardly or radially and extend crosswise or concentrically. The cross or concentric stiffeners C are positioned outwardly from the inner annular wall 9 is spaced concentric relation. The two inner concentric stiffeners C-1 and C-2 have fewer outwardly extending or radial stiffeners R therebetween than the outermost concentric stiffeners C-3, C-4, and C-5. In a tank T having a diameter of 13 feet, the concentric stiffeners C are placed about 1 foot apart. The strengthening means S also include outwardly extending stiffeners R, which may extend radially outwardly. As shown in FIG. 3, there are a number of long radial stiffeners 19 which extend from the inner annular wall 9 outwardly to the flange 10. Outwardly of the second concentric stiffener C-2 extend short or radial stiffeners 20, which also extend to the flange 10. The purpose of the radial stiffeners R and cross stiffeners C is to reinforce or strengthen the inner member 7 so that no large area thereof is unsupported by strengthening means S. The stiffeners shown on the inner member 7 are flat bars, but under some conditions the stiffeners may have a tee or angle cross-section. Their size depends upon their shape, strength, and number over a given area, as well as the thickness of the inner member 7, the weight of the contents, the size of the tank, and the pressures to be used within the pressure chamber P.

The stiffeners R are connected to the inner member 7 by side welds 21 along the lower edges of the sides 22 of the stiffeners R. The stiffeners C are of shorter length and are connected to the outer surface 18 of the inner member 7 by side welds 23 along the lower portions of the sides 24 of the stiffeners C and by end welds 25 along the ends 26 of the stiffeners C.

As shown in FIG. 4, the flange 10 has a thickened inner lower portion 27. The flange 10 is welded to the lower shell 5 by means of an upper weld 28 and a lower weld 29. The radial stiffeners R are welded to said flange 10 by a full penetration weld 30. The lower shell 5 is welded, as at 31, to the inner member 7 in edgewise abutting relation. As shown in FIG. 4, the outer edge of the outer member 8 is positioned against a thickened portion 27 of the flange 10 and is welded to the flange 10. The flange 10 functions as a tension ring. When pressure is within the pressure chamber P, such pressure tends to force the inner member 7 outwardly, which is resisted by said flange 10 and the gussets 6 connected between the flange 10 and the lower shell 5. The gussets 6 are suitably connected to the flange 10, such as by welding.

As shown in FIG. 4, the ends 26 of the cross stiffeners C are not connected to the stiffeners R and are spaced about 1 inch from the stiffeners R. The upper corners of the cross stiffeners C are cut at an angle or slope, as at 32, to permit the end welds 25 to be made on the stiffeners C. Also, the angular cuts 32 make the stiffeners C less rigid near their ends 26 and near the welds 25 so as to relieve strains on the welds.

The outer member 8 does not come into contact with liquid wort or with the contents within the tank T, so the outer member 8 need not be made from expensive stainless steel clad but may be made from carbon steel having a thickness required to resist internal pressure. The thickness of the steel and the type of steel used for the bottom head H is important. The thickness of the thin clad inner member 7 of a brew kettle T of this size must be such that the clad is thick enough to work with during fabrication and to hold the contents and have good heat transfer therethrough, since the purpose of the brew kettle is to heat the contents by means of the steam in the pressure chamber P. The 20 percent clad of stainless steel is required because stainless steel does not adversely affect the contents of the brew kettle T. The total thickness of the inner member 7 must be sufficient to withstand external pressures when strengthened by the stiffeners C and R, but must be sufficiently thin to have good heat transfer. Without said strengthening means and with the pressures normally encountered within the pressure chamber P, the inner member 7 would dimple or collapse upwardly because of the pressure therein. If the inner member 7 is made from thicker material so as to resist the pressures within the pressure chamber P, then the heat transfer becomes very inefficient. Due to the relatively high pressures and temperatures within the pressure chamber P during the various cycles, the inner member 7 and outer member 8 tend to separate slightly but this is not important with the present construction wherein the outer member 8 is not connected to the inner member 7 at any point over its large area, other than at the inner annular wall 9 and the flange 10. Because of this unique construction, the spaced members 7 and 8 may flex slightly with respect to one another or may "breathe." In this way, there are no welds between clips or brackets connecting the two members 7 and 8, so there are no welds which tend to rupture when said members are forced away from each other by relatively high pressures and temperature within the pressure chamber P.

The operation of the brew kettle T is substantially as follows: With the interior cleaned and all valves in proper position, liquid wort is directed into the kettle and filled to a point or depth which is slightly above the top of the flange 10. This prevents any searching of the liquid. Steam is then directed into the pressure chamber P at 50 psi and 300°F., and at the same time liquid is directed into the kettle T until it reaches a level near the top of the kettle. If desired, an agitator may be provided within the kettle to agitate the contents. Also, in some situations there may be additional heating means (not shown) within the tank T. Such heating means might include a coil of two turns spaced about one foot inwardly of the wall 2. The coil would have suitable inlets and outlets for steam. The steam within the pressure chamber P heats the contents from their initial 167°F. temperature to 212°F. in about 32 minutes. The steam is then shut off at the end of the cycle and the bottom outlet 13 is opened to allow the contents to flow out of the bottom of the kettle T. The interior of the kettle T is then washed, preferably with warm water at 167°F. The kettle is then ready to receive another load or batch of liquid.

Under the most favorable controlled conditions, the metal in the kettle is subjected to temperatures from 167°F. to 212°F., but the 167°F. may be lower at times if the kettle is shut down for any reason or if the wash water or contents should happen to be below 167°F. The changes in temperature tend to set up a thermal shock in the metal, which when repeated periodically with great frequency over the years sets up extraordinary fatigue in the metal and any welds thereto. Prior kettles having inner and outer members with clips welded therebetween frequently fail at the point of the weld due to this fatigue caused by the cyclical or periodic pressure and temperature differences.

The present invention allows the inner member 7 to be as thin as possible so that there is better heat transfer from the steam through the inner bottom 7 to the contents. By using external stiffening means S on the outer surface 18 of the inner member 7 which are not connected to the outer member 8, the inner member 7 is strengthened against the external jacket pressure but the welds do not fail since the pressure is not pushing the inner and outer bottoms 7 and 8 in opposite directions against the holding force of the welds or plug welds. With this unique arrangement, cyclical problems are eliminated and the kettles can be operated at thirteen or more brews per day if desired without being subjected to undue fatigue.

In a brew kettle which has an interior diameter of 13 feet and a cylindrical wall whose height is about 9 feet the inner bottom 7 may be made of carbon steel five-sixteenths inch thick with its inner 20 percent being stainless steel. This thickness is capable of supporting the liquid within the kettle without the need of any strengthening means. However, if steam at 50 psi and 300°F. is directed into the pressure chamber P, the inner bottom 7 without any strengthening means thereon would dimple upwardly or might fail completely. However, with the strengthening means S, such as the radial and cross strips R and C, the thin inner member 7 gives good heat transfer but also retains its shape when the pressure in the pressure chamber P is raised. This construction allows the inner member 7 to be free of connections with the outer member 8 thereby avoiding fatigue or failures that would otherwise occur.

What is claimed is:

1. A tank bottom having spaced inner and outer members, said inner member being made of relatively thin material having good heat transfer properties, said spaced inner and outer members forming part of a pressure chamber for heating the contents of said tank, an inner annular wall connected between said inner and outer members at their inner edge portions and a flange connected between said inner and outer members at their outer portions, said pressure chamber being subjected to relatively high pressures and temperatures, said inner bottom having strengthening means connected to the outer surface thereof, and strengthening means comprising outwardly extending stiffeners at least some of which extend from a point adjacent to said inner annular wall to said flange, said strengthening means further comprising cross stiffeners, said cross stiffeners being divided into segments which are in spaced relation from said outwardly extending stiffeners, said strengthening means not being directly connected to said outer member, said inner member being strong enough to hold the contents of the tank but not strong enough to withstand the pressures of the pressure chamber over a period of use without said strengthening means.

2. The improvement set forth in claim 1 wherein said inner and outer members are connected only at their central portions by said inner annular wall and at their peripheral edges by said flange.

3. The improvement set forth in claim 1 wherein said outwardly extending stiffeners extend radially outwardly and wherein only some of said stiffeners are directed to said inner annular wall.

4. The improvement set forth in claim 1 wherein said cross stiffeners are of less height at their ends where they are welded to said inner member then they are in portions between said ends.

5. The improvement set forth in claim 1 wherein said pressure chamber has a steam inlet positioned near its outer periphery and a steam outlet positioned near its inner central portion.

6. The improvement set forth in claim 1 wherein said spaced inner and outer members are in substantially parallel relation.

* * * * *

UNITED STATES PATENT OFFICE
CERTIFICATE OF CORRECTION

Patent No. 3,685,508            Dated August 22, 1972

Inventor(s)   Le Roy W. Heilmann

It is certified that error appears in the above-identified patent and that said Letters Patent are hereby corrected as shown below:

Column 4, line 17, "FIG. 4" should be "FIG. 5".

Column 5, line 5, "searching" should be "scorching".

Column 6, line 23, "and" should be "said".

Signed and sealed this 23rd day of January 1973.

(SEAL)
Attest:

EDWARD M. FLETCHER, JR.            ROBERT GOTTSCHALK
Attesting Officer                     Commissioner of Patents